424/75 [redacted] [redacted]

UNITED STATES PATENT OFFICE.

GEORGE HENRY, OF HAMILTON, ONTARIO, CANADA.

IMPROVEMENT IN COMPOSITIONS FOR PRESERVING ANIMAL AND VEGETABLE SUBSTANCES.

Specification forming part of Letters Patent No. 188,904, dated March 27, 1877; reissue No. 7,072, dated May 8, 1877; application filed April 28, 1877.

*To all whom it may concern:*

Be it known that I, GEORGE HENRY, of Hamilton, Ontario, Dominion of Canada, have invented a new and useful Composition for Preserving Animal, Vegetable, and other Perishable Matter; and I do hereby declare that the following is a full, clear, and exact description thereof, which will enable others skilled in the art to which it appertains to make and use the same.

My invention relates to a new and useful composition of matter for preserving all perishable articles or matter, be it animal, vegetable, or anything else, consisting of about two parts of finely ground or pulverized *Baptisia tinctoria* (wild-indigo shrub) root bark and four or more parts of sulphur, which are mixed together and burned in a tight case containing the article or articles that is to be preserved, as and for the purposes as hereinafter more fully and at large will appear.

The main object of my invention is to provide a simple, cheap, and effective composition whereby a human corpse may be preserved perfectly natural, free from discoloration, decomposition, smell, &c., for an indefinite period, for the purposes of transportation and exhibition, but principally for use in medical colleges or undertakers' establishments, to preserve corpses for post-mortem examination, dissecting and lecturing subjects.

As is well known, human bodies immediately after death commence to decompose, discolor, and smell; therefore, when to be used for dissecting subjects, for lecturing upon, or post-mortem examination, &c., they have to be acted upon at once. There is also the risk, with all ordinary subjects, of being poisoned by inoculation of the blood. The dissecting of subjects by medical colleges can, for these reasons, only be carried on in cold weather, with great risk to the operator, and frequently under difficulties, and in great haste, sufficient time often not being had to spend on some subjects to fully lecture upon them, because of rapid decomposition, wasting away, &c., taking place. Also, shortly after death, the flesh falls away, becomes discolored and emaciated, thus rendering the person unrecognizable or past identification.

When treated according to my invention, as hereinafter set forth, all of the above objections are avoided, and the corpse is kept perfectly fresh and natural, and decomposition, discoloring, and smelling completely arrested for a long time. All danger of poisoning by inoculation is also completely prevented. The wasting or falling away of the corpse is also prevented, and the features remain as natural as in life. All discolorations or diseased parts of the flesh are also changed or bleached, and assume a natural hue. The corpse, on the whole, after being treated, assumes the appearance of wax-work, and solidity is given to the flesh and other parts, so that it can be dissected with ease at any time and with impunity. The agents employed by me also being disinfectants, as well as antiseptics, all danger of communicating contagious diseases is therefore entirely overcome, and subjects, such as are now unapproachable, may be examined at pleasure, and without danger.

Having slightly commented upon the objects, advantages, &c., of my invention, I will proceed to describe the same, so that others may make and use it.

I take of *Baptisia tinctoria* (wild-indigo shrub) root bark about two parts, and of pure sulphur about four or more parts, and thoroughly mix together.

When desired for use, this composition is placed in an open vessel, within an air-tight apartment with the body, or other article to be preserved, and the composition ignited. The air-tight apartment is then closed and the body allowed to remain in the chamber, subjected to the action of the gases, &c., until the combustion of the composition ceases, and from two to twenty-four hours thereafter, when the body, or other article, is thoroughly impregnated with the gases, which remove all causes of decomposition, purify and and disinfect the subject, thus preserving it. In using this composition for the preservation of human bodies, instead of having an air-tight chamber specially prepared for it, in numerous cases the vessel containing the burning composition may simply be placed in the coffin or casket with the body, and the lid of the coffin screwed down tight, and allowed to remain thus for from two to twenty-four hours, as the case may require. The body may then be taken out and exposed to the atmosphere, in which condition, and without the least further attention or preparation, it will keep for a long time.

For use by undertakers, this composition and mode of treatment is invaluable, for by it a corpse may be quickly and effectually preserved at a nominal cost, and without trouble, dirt, or labor, thus dispensing with the laborious, costly, and, in many respects, objectionable mode of preserving by ice. When preserved by ice, it is only for a short time, or as long as the body remains frozen; whereas, when preserved according to my invention, the body remains perfectly good, and in a natural condition for months.

A further and great advantage of this invention is that all smell from the body is arrested or prevented. Thus bodies can readily be transported over the railroads without meeting the present objections of railroad companies to receiving them because of said smell.

These ingredients employed by me, being antiseptic and disinfectant in their action, are highly useful to the medical fraternity for the purpose of preserving dead bodies, and to undertakers because of the simplicity and ease of application, their effectiveness, and cheapness.

In some instances, the bark of the cascarilla shrub, (*Croton eleutheria*,) and also frankincense, may be employed either separately or combined together with the other ingredients, if found desirable or thought necessary.

I find that any animal substances, even flesh intended for food, will be preserved perfectly fresh and good for an indefinite period, by subjecting it to the treatment already described.

I find further that this substance, wild-indigo-root bark and sulphur, is admirably adapted for the preservation also of fruits, vegetables, &c., and, for this purpose, the fruits and vegetables to be preserved may be either simply subjected to the fumes of the burning composition, as already described in treating animal matter, or the fruits or vegetables may be subjected to the fumes coming from the burning sulphur and indigo, and then immersed in water impregnated with such fumes.

Having thus described my invention, what I claim as new, and desire to secure by Letters Patent, is—

The composition for preserving animal, vegetable, and other articles, consisting of *Baptisia tinctoria* (wild-indigo shrub) root bark and sulphur, in about the proportions above described, and for the purposes set forth.

GEORGE HENRY.

Witnesses:

J. W. HAMILTON JOHNSON,
WM. H. BRERETON.